(12) United States Patent
Keller et al.

(10) Patent No.: US 10,371,209 B2
(45) Date of Patent: Aug. 6, 2019

(54) RESHAPED RING FOR ROLLING BEARING

(71) Applicant: Schaeffler Technologies AG & Co. KG, Herzogenaurach (DE)

(72) Inventors: Torsten Keller, Heßdorf (DE); Heinz Pedrotti, Dittelbrunn (DE); Winfried Ott, Auernhofen (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 15/754,083

(22) PCT Filed: Aug. 11, 2016

(86) PCT No.: PCT/DE2016/200371
§ 371 (c)(1),
(2) Date: Feb. 21, 2018

(87) PCT Pub. No.: WO2017/054807
PCT Pub. Date: Apr. 6, 2017

(65) Prior Publication Data
US 2018/0238391 A1    Aug. 23, 2018

(30) Foreign Application Priority Data

Sep. 28, 2015 (DE) .......... 10 2015 218 543

(51) Int. Cl.
*F16C 33/58* (2006.01)
*F16C 33/64* (2006.01)
*F16C 19/10* (2006.01)

(52) U.S. Cl.
CPC .......... *F16C 33/588* (2013.01); *F16C 33/585* (2013.01); *F16C 33/64* (2013.01); *F16C 19/10* (2013.01); *F16C 2220/42* (2013.01)

(58) Field of Classification Search
CPC .. F16C 33/588; F16C 33/585; F16C 2220/42; F16C 19/10
See application file for complete search history.

(56) References Cited

U.S. PATENT DOCUMENTS 1,544,676 A * 7/1925 Morton ................... F16C 19/10
                                                                    384/615
1,672,012 A * 6/1928 Tyson ..................... F16C 19/364
                                                                    384/565

(Continued)

FOREIGN PATENT DOCUMENTS

DE    102005010952 A1 *  9/2006 ............ F16C 19/362
DE    102009036347 A1     2/2011
(Continued)

*Primary Examiner* — Thomas R Hannon
(74) *Attorney, Agent, or Firm* — Kevin L. Parks

(57) ABSTRACT

Rings for a rolling bearing are disclosed, wherein the rings define a primary axis (A). The ring may include a ring formed as a hollow ring having a hollow chamber encircling the primary axis (A). A wall of the hollow ring may be of one-piece and/or seamless design in an axial section along the primary axis (A). The ring may be a bearing ring configured for rolling contact with rolling elements. In one example, the wall includes a raceway section in the wall for rolling contact with the rolling elements, a bearing bottom section for supporting the ring, two lateral supporting wall sections, and two connecting sections for connecting the two lateral supporting wall sections to the raceway section.

14 Claims, 2 Drawing Sheets

(56) References Cited

U.S. PATENT DOCUMENTS

| | | | | |
|---|---|---|---|---|
| 3,404,925 A | * | 10/1968 | Bailey | F16C 27/04 |
| | | | | 384/535 |
| 3,645,593 A | * | 2/1972 | Irwin | F16C 33/58 |
| | | | | 165/47 |
| 4,081,204 A | * | 3/1978 | Bauer | F16C 19/166 |
| | | | | 29/898.063 |
| 4,458,959 A | * | 7/1984 | Roling | F16C 19/163 |
| | | | | 384/621 |
| 8,840,314 B2 | * | 9/2014 | Keller | F16C 23/086 |
| | | | | 384/551 |

FOREIGN PATENT DOCUMENTS

| | | |
|---|---|---|
| DE | 102011006020 A1 | 9/2012 |
| EP | 0042078 A1 | 12/1981 |

\* cited by examiner

RESHAPED RING FOR ROLLING BEARING

CROSS-REFERENCE TO RELATED APPLICATIONS

This application is the U.S. National Phase of PCT Appln. No. PCT/DE2016/200371 filed Aug. 11, 2016, which claims priority to DE 102015218543.5 filed Sep. 28, 2015, the entire disclosures of which are incorporated by reference herein.

TECHNICAL FIELD

The disclosure relates to a ring for a rolling bearing.

BACKGROUND

Rolling bearings are an important component in the construction of machines in which subassemblies or component parts have to be pivoted or rotated relative to one another. Rolling bearings are therefore sold in large numbers in various sizes and designs, especially in the automotive industry. It is therefore desirable to be able to produce the components of rolling bearings in a way which saves as much material as possible and is as inexpensive as possible.

For example, printed publication DE 10 2009 036 347 A1, discloses a method for producing a shoulder ring for a spherical roller bearing. In this method, a straight tube section is first of all bent into a ring having two ring ends separated by a gap, the two ring ends of which are then joined together. The ring blank closed in upon itself in this way, being welded for example, is finally reshaped in a single pass in a pressing device having a suitable contour die to give a shoulder ring with the desired geometry in axial section, which generally differs from a circular shape.

SUMMARY

It is an object of the present disclosure to propose a ring for rolling bearings, a rolling bearing having at least one such ring and a method for producing the ring, which allows material-saving and inexpensive production.

This object may be achieved by a ring for a rolling bearing having the features described herein and shown in the figures. Additional embodiments of the disclosure will also emerge from the following description and the attached figures.

In the context of the disclosure, a ring for a rolling bearing is proposed. The ring defines a primary axis, wherein the primary axis passes axially through the center of the ring. In particular, the ring is designed as a body of revolution, which has a constant profile in axial section in the circumferential direction. The ring is preferably composed of metal, in particular of a steel material, more specifically, a steel material with the designation E235, e.g. of a normalized steel material with the designation E235+N. Optionally, the ring can be overmolded with plastic.

The ring is designed as a hollow ring. The hollow ring has a hollow chamber, wherein the hollow chamber encircles the primary axis, in particular continuously. In axial section, the wall of the hollow ring is of one-piece design, and of circumferentially continuous and/or seamless design. In other words or by way of additional explanation, the wall of the hollow ring forms a continuous curve around the hollow chamber in axial section. In particular, the ring is of one-piece design.

In the context of the disclosure, it is proposed that the ring be designed as a bearing ring. The bearing ring is designed for rolling contact with rolling elements, in particular balls. It is an advantage of the disclosure that the bearing ring can be produced in a simple and material-saving manner in comparison with reshaped rings or sheet-metal rings. It is nevertheless possible to maintain sufficient dimensional accuracy and thus low tolerances for many applications.

In one embodiment of the disclosure, the wall of the bearing ring has a raceway section. The raceway section forms the rolling surface for the rolling elements. In particular, the raceway section is penetrated by pressure lines of the rolling bearing. The raceway section is preferably designed as a groove. The groove is designed as a depression, in particular a slot, extending in the circumferential direction. The groove extends completely around the primary axis. The groove has groove walls and a groove base. The groove is of u-shaped design, for example. The rolling elements, in particular balls, form a contact region with the groove of u-shaped design, in particular at the groove base. Alternatively, the groove is of v-shaped design. The rolling elements, in particular the balls, form contact regions with the groove of v-shaped design, in particular at the groove walls. In particular, the groove is designed to accommodate the rolling elements, in particular the balls. The groove is designed as a guide for the rolling elements, in particular as an axial guide along the circumferential direction around the primary axis. The rolling elements, in particular the balls, roll in the groove and hence on the raceway section.

In principle, the bearing ring can be designed as a radial bearing ring. However, with a view to simplicity of manufacture, it is may be preferred that the bearing ring is designed as an axial bearing ring and/or that the groove is open in an axial direction.

In a development of the disclosure, the wall of the bearing ring has a bearing bottom section. The bearing bottom section is arranged opposite the raceway section. The bearing bottom section forms a bottom surface, which is preferably of planar or level design. In particular, the bottom surface extends in a radial plane relative to the primary axis. The bearing bottom section is designed to support the bearing ring and hence the axial rolling bearing on a supporting structure, in particular a bearing partner, via the bottom surface.

The wall of the bearing ring may have two lateral supporting wall sections. The two lateral supporting wall sections each form a cylindrical surface. The two lateral supporting wall sections and/or the cylindrical surfaces are arranged coaxially with respect to the primary axis of the bearing ring. The two lateral supporting wall sections each have a transitional region, wherein a transitional region of this kind in each case connects one of the two lateral supporting wall sections to one of the ends of the bearing bottom section. The transitional regions are of bent design. In particular, the two lateral supporting wall sections are arranged perpendicularly or approximately perpendicularly to the bearing bottom section.

The bearing ring has two connecting sections. The two connecting sections each connect one of the two lateral supporting wall sections to the raceway section. The connecting sections are of angled design in axial section or designed as corner regions. At least one of the two connecting sections preferably has a stop face. In particular, the stop face is arranged on the radially outer connecting section. More specifically, the stop face is aligned perpendicularly to the primary axis and/or lies in a radial plane relative to the primary axis. For example, the stop face is designed to guide a cage for the rolling elements and/or to support a sealing washer. The stop face is preferably stamped.

The two lateral supporting wall sections support the two connecting sections and hence the raceway section. In axial section, the bearing bottom section, the two lateral supporting wall sections, the two connecting sections and the raceway section together form the continuous encircling wall, wherein the wall is of uninterrupted and/or seamless design in axial section.

In another embodiment of the disclosure, the hollow chamber has two hollow chamber sections. The hollow chamber sections are enclosed by the raceway section, the bearing bottom section, the two lateral supporting wall sections and the two connecting sections and are divided, in particular separated, from one another by the raceway section. The hollow chamber sections can be arranged in such a way as to be connected to one another or separated from one another. The hollow chamber sections are of triangular design, in particular of right-angled triangular design, in axial section, wherein the corners are, in particular, partially rounded. The two hollow chamber sections are arranged opposite one another in axial section. In particular, the two hollow chamber sections are of mirror-image design relative to one another in axial section. The two hollow chamber sections are arranged coaxially in the bearing ring.

In a development of the disclosure, the raceway section is arranged at a distance from the bearing bottom section. In this case, the lower side of the raceway section is arranged at a distance from the upper side of the bottom section. In this development, the two hollow chamber sections are connected to one another. Axial forces acting on the raceway section are cushioned by a change in the distance between the raceway section and the bearing bottom section and thus by a change in the shape of the hollow chamber sections. The spacing of the raceway section from the bearing bottom section increases the elasticity of the bearing ring.

In an alternative development of the disclosure, the lower side of the raceway section rests on the upper side of the bearing bottom section. The bearing bottom section supports the raceway section. In particular, the fact that the raceway section rests on the bearing bottom section reduces the loading on the raceway section, the two connecting sections and/or the two lateral supporting wall sections. This alternative development leads to a more stable configuration. However, loads on the bearing ring can be compensated elastically by deflection of the raceway section into the hollow chamber sections.

The disclosure furthermore relates to a rolling bearing, wherein the rolling bearing has at least one bearing ring, such as one of the kind described above. The rolling bearing can be designed as a radial rolling bearing but, as a particular preference, the rolling bearing is designed as an axial rolling bearing and, more specifically, as an axial ball bearing. It is possible for the rolling bearing to have just one bearing ring of this kind. As an alternative, the rolling bearing can have two such bearing rings or—in the case of multi-row rolling bearings—more than two such bearing rings. The axial rolling bearing is preferably suitable and/or designed for heavy goods vehicles and/or industrial trucks, e.g. as a spring strut bearing or release bearing, or for forklift trucks.

The rolling bearing comprises the rolling elements, in particular the balls, wherein the rolling elements are arranged in such a way as to roll on the bearing ring. As an optional supplementary measure, the rolling bearing comprises the cage for the rolling elements and/or the sealing washer for sealing the rolling bearing against contaminants. In this development, it may be preferred that the bearing ring has the stop face, in particular the stamped stop face, supporting the sealing ring and/or the cage.

The disclosure furthermore relates to a method for producing the ring, namely the bearing ring, such as the kind described above. The bearing ring is manufactured from a ring blank. The ring blank is designed as a hollow torus and/or as a doughnut, in particular as an annular tube. The ring blank is reshaped by a shaping press tool, in particular in a die matching the bearing ring. Here, a normalized steel material promotes the result of the reshaping process. The reshaping of the ring blank into the bearing ring does not involve machining and allows time-saving and thus inexpensive production of the ring.

In a development of the disclosure, the ring blank is produced from a straight tube. The straight tube is shaped into the ring blank, in particular the annular tube, preferably by a three-roller roll-bending machine. The ring ends of the ring blank are connected to one another, in particular being connected to one another by a thermal method, more specifically welded to one another. As welding methods, it is possible, in particular, to use autogenous welding, resistance welding or orbital welding without filler material, thereby producing particularly heavy-duty weld seams.

In a possible development of the disclosure, the bearing ring is subject to further processing after reshaping, e.g. by grinding. In particular, irregularities or faults arising during reshaping can thereby be compensated. As a further measure, the connecting seam between the two tube ends can be smoothed by the finishing operation.

In another development of the disclosure, at least one of the two connecting sections has the stop face. The stop face is either produced together with the shape of the bearing ring or shaped by finishing, e.g. by stamping. The stop face is preferably designed in such a way that a cage or a sealing washer can be arranged on the stop face.

In an optional development of the disclosure, the bearing ring is hardened. This is accomplished, for example, by heat treatment, in particular by hardening and tempering, wherein hardnesses of up to 50 HRC are made possible by hardening and tempering. As an alternative, hardening can be accomplished by carbonitriding the bearing ring.

In another possible development of the disclosure, the bearing ring is protected from external influences by subsequent coating. The bearing ring is preferably protected—from corrosion for example—by overmolding with plastic.

BRIEF DESCRIPTION OF THE DRAWINGS

Further features, advantages and effects of the disclosure will emerge from the following description of illustrative embodiments of the disclosure and from the attached figures, wherein.

DETAILED DESCRIPTION

Figure 1:
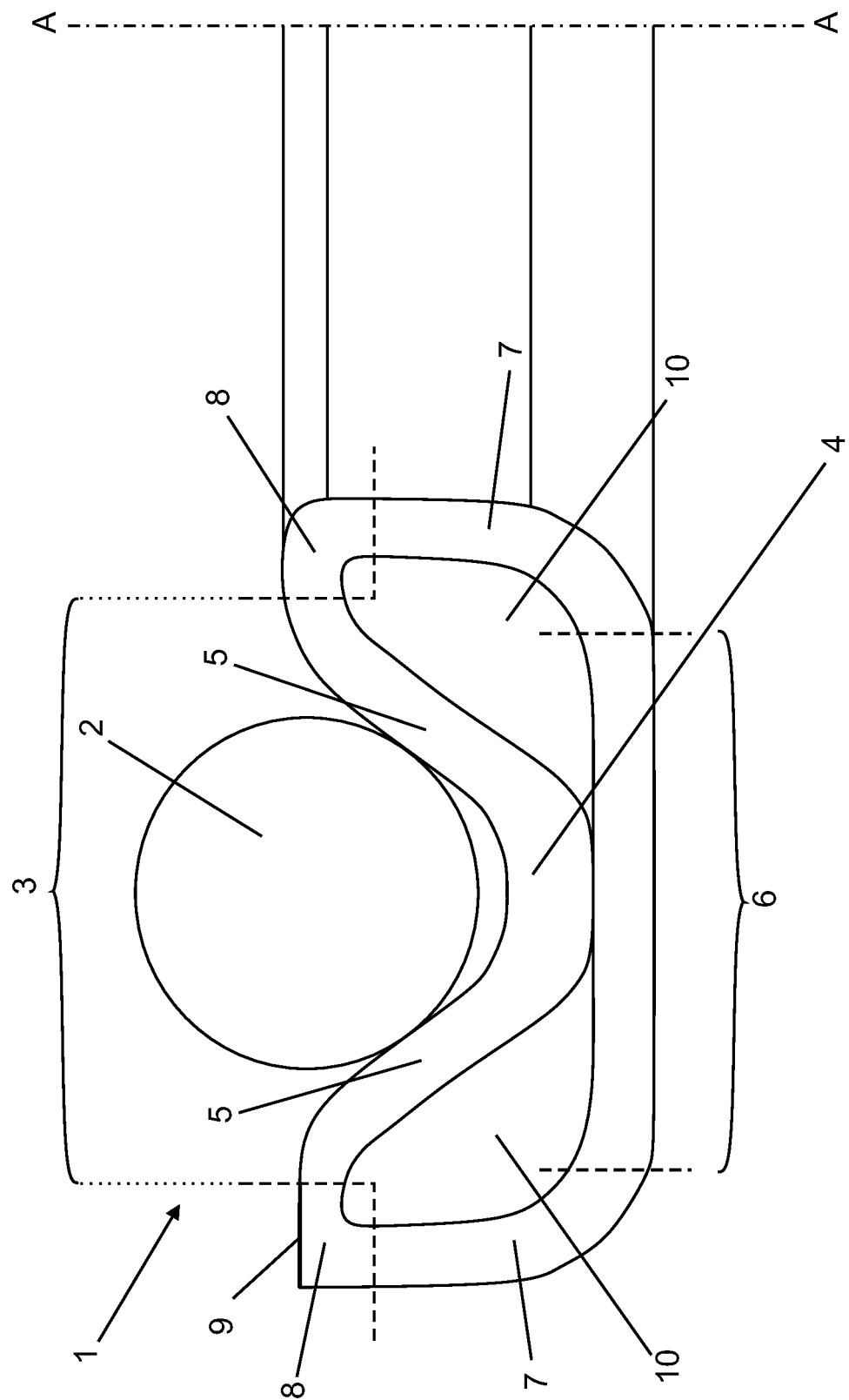
FIG. 1 shows a profile of a bearing ring in axial section.

FIG. 1 shows the profile of a bearing ring 1 in an axial section along a primary axis A as one illustrative embodiment of the disclosure. A ball 2 is placed as a rolling element onto or into the bearing ring 1. The profile, in particular the profile in axial section, is of constant or uniform design around the primary axis A. The bearing ring 1 is thus designed as a body of revolution of the profile in axial section around the primary axis A.

The bearing ring 1 has a raceway section 3 for rolling contact with the ball 2. The raceway section 3 is designed as a groove, in particular a slot, and is open in an axial direction relative to the primary axis A. The groove is designed as a guide for the ball. The groove is v-shaped and has a groove base 4 and two groove walls 5. The groove walls 5 are of slightly convex design. The groove base 4 is of a depth such that the ball 2 does not touch the groove base 4. This results in a small area of contact between the ball 2 and the groove of the raceway section 3, in particular the groove walls 5, thereby keeping friction low.

The bearing ring 1 has a bearing bottom section 6. The bearing bottom section 6 is of planar design and is aligned perpendicularly to the primary axis A. The bearing bottom section 6 is used to support and/or fix the bearing ring 1 and hence the rolling bearing on a supporting structure and/or a bearing partner. The planar shape of the bearing bottom section 6 allows it to rest in a stable manner on the supporting structure and/or allows stable fixing.

The bearing bottom section 6 is arranged axially opposite the raceway section 3. In particular, the raceway section 3 faces in one axial direction and the bearing bottom section 6 faces in the other axial direction. In this illustrative embodiment, the raceway section 3 rests on the bearing bottom section 6 and is supported by the bearing bottom section 6.

The bearing ring 1 furthermore has two lateral supporting wall sections 7. The lateral supporting wall sections 7 are each connected to one side of the bearing bottom section 6. For this purpose, that end of the lateral wall sections 7 which connects to the bearing bottom 6 is of bent design. The lateral supporting wall sections 7 are arranged perpendicularly to the bearing bottom section 6 and/or coaxially with the primary axis A.

The bearing ring 1 has two connecting sections 8. The two connecting sections 8 each connect one of the two lateral supporting wall sections 7 to one of the two ends of the raceway section 3. The connecting sections 8 are of right-angled design.

The radially outer of the two connecting sections 8, which is further away from the primary axis A, has a stop face 9. The stop face 9 is shaped by stamping during the reshaping process, for example. As an alternative, the stop face 9 is shaped by stamping in a finishing operation. The stop face 9 is of planar design and forms a plane, wherein the plane is aligned perpendicularly to the primary axis A. With the stop face 9, the radially outer connecting section 8 forms an edge with a smaller edge radius than the radially inner connecting section 8. The stop face 9 is used to support or guide a cage for the balls 2 and/or a sealing ring for sealing the rolling bearing.

The raceway section 3, the bearing bottom section 6, the two lateral supporting wall sections 7 and the two connecting sections 8 form a hollow chamber. The hollow chamber has two mutually separate hollow chamber sections 10. In particular, each one of the two hollow chamber sections 10 is enclosed by the raceway section 3, the bearing bottom section 6, one of the two lateral supporting wall sections 7 and one of the two connecting sections 8.

The hollow chamber sections 10 are of triangular design in axial section and have partially rounded corners. The hollow chamber sections 10 are separated from one another by the raceway section 3, which rests on the bearing bottom section 6.

By changing the shape of the hollow chamber sections 10, it is possible, for example, to cushion axial forces acting on the ball 2 and thus on the raceway section 3, in particular the groove walls 5. Moreover, the hollow chamber sections reduce the weight of the bearing ring 1 and hence the weight of the rolling bearing in comparison with a solid construction.

Figure 2:
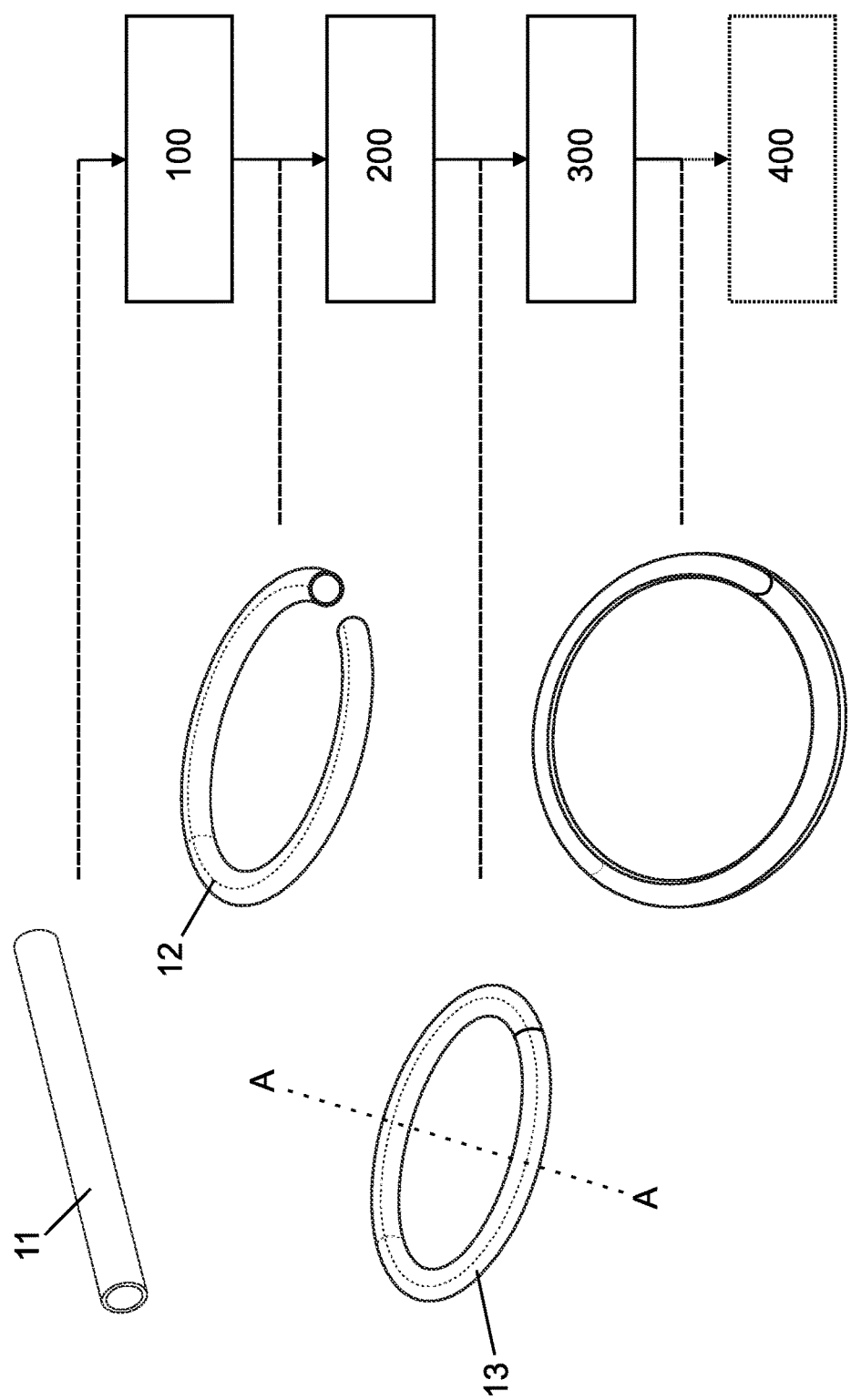
FIG. 2 shows a flow diagram of the method steps for the production of a bearing ring.

FIG. 2 shows method steps during the production of the bearing ring 1 from a straight tube 11 in a flow diagram. This shows three method steps and one optional fourth method step. Starting from the straight tube 11, the straight tube 11 is bent into an open ring in a first method step 100. The deformation of the straight tube 11 into the open ring 12 is accomplished by a three-roller roll-bending machine, for example.

In a second method step 200, the ends of the tube bent into the open ring 12 are connected to one another to form a ring blank 13. Connection is accomplished by means of thermal joining, for example, in particular by welding. The ring blank is designed as a toroidal or doughnut-shaped hollow ring.

In a third method step 300, the ring blank 13 is reshaped. During this process, the upper ring wall of the ring blank 13 is pressed in axially until the upper ring wall of the ring blank is resting on the lower ring wall of the ring blank 13. The upper ring wall is reshaped to give a depression until the raceway section 3 with the groove is formed. The lateral ring walls remain and become the lateral supporting walls 7. The lower ring wall is reshaped to be somewhat broader and flatter until it forms the bearing bottom section 6. The ring blank 13 is reshaped in such a way that a profile as shown in FIG. 1 is obtained in axial section.

For example, the ring blank is inserted into a female die and pressed in by means of a punch in such a way that the ring blank 13 is reshaped into the bearing ring 1 with a groove. In this process, it is possible to reshape the raceway section 3 of the bearing ring 1 in such a way that the raceway section 3 rests on the bearing bottom section 6. As an alternative, a distance can be maintained between the raceway section 3 and the bearing bottom section 6.

Method steps 100 to 300 are suitable, in particular, for bearing rings 1 of rolling bearings with a diameter of more than 100 mm, preferably up to diameters of 1500 mm.

In an optional fourth method step 400, the bearing ring 1 is subject to finishing. The bearing ring is finished by grinding, for example. As an optional additional feature, the bearing ring 1 has the stop face 9, wherein, in particular, the stop face 9 is formed by stamping. The stop face 9 is used, for example, to support a cage for the rolling elements, in particular for the balls, and/or to support a sealing ring for protecting the rolling elements from contamination.

LIST OF REFERENCE SIGNS 1 bearing ring
2 ball
3 raceway section
4 groove base
5 groove wall
6 bearing bottom section
7 lateral supporting wall section
8 connecting section
9 stop face
10 hollow chamber section
11 straight tube
12 open ring
13 ring blank
A primary axis

The invention claimed is:

1. A ring for a rolling bearing, wherein the ring defines a primary axis (A), comprising:
   a ring formed as a hollow ring having a hollow chamber with two hollow chamber sections encircling the primary axis (A) and a planar stop face aligned perpendicularly to the primary axis (A) for a cage or a sealing washer, and
   a wall of the hollow ring is of one-piece or seamless design in an axial section along the primary axis (A),
   wherein the ring is a bearing ring configured for rolling contact with rolling elements, the wall has a raceway section for rolling contact with the rolling elements, and the raceway section is designed as a v-shaped groove comprising first and second groove walls for contacting the rolling elements with a groove base between the first and second groove walls that does not contact the rolling elements.

2. The ring as claimed in claim 1, wherein the wall has a bearing bottom section for supporting the ring, two lateral supporting wall sections, and two connecting sections for connecting the two lateral supporting wall sections to the raceway section.

3. The ring as claimed in claim 2, wherein the raceway section rests on the bearing bottom section, wherein the bearing bottom section supports the raceway section.

4. The ring as claimed in one claim 1, wherein the wall encloses the two hollow chamber sections.

5. A rolling bearing having at least one ring as claimed in claim 1, wherein the rolling bearing is designed as an axial rolling bearing.

6. A method for producing the ring as claimed in claim 1, wherein the ring is reshaped from a ring blank by a press tool.

7. The method for producing the ring as claimed in claim 6, wherein the ring blank is bent out of a straight tube forming a bent tube, wherein ends of the bent tube are thermally connected to form the ring blank.

8. A ring for a rolling bearing, wherein the ring defines a primary axis (A), comprising:
   a bearing ring formed as a hollow ring having a hollow chamber encircling the primary axis (A) and a planar stop face aligned perpendicularly to the primary axis (A) for a cage or a sealing washer;
   a wall of the hollow ring is of seamless design in an axial section along the primary axis (A); and
   wherein the wall includes a raceway section in the wall for rolling contact with rolling elements, a bearing bottom section for supporting the ring, two lateral supporting wall sections, and two connecting sections for connecting the two lateral supporting wall sections to the raceway section.

9. The ring as claimed in claim 8, wherein the raceway section is designed as a groove for a rolling element.

10. The ring as claimed in one claim 8, wherein the hollow chamber has two hollow chamber sections, wherein the wall encloses the two hollow chamber sections.

11. The ring as claimed in claim 8, wherein the raceway section rests on the bearing bottom section, wherein the bearing bottom section supports the raceway section.

12. A rolling bearing having at least one ring as claimed in claim 8, wherein the rolling bearing is designed as an axial rolling bearing.

13. A method for producing a ring for a rolling bearing, the ring comprising:
   a primary axis (A); and,
   a bearing ring formed as a hollow ring having a hollow chamber encircling the primary axis (A), wherein:
      a wall of the hollow ring is of seamless design in an axial section along the primary axis (A);
      the wall comprises:
         a raceway section in the wall for rolling contact with rolling elements;
         a bearing bottom section for supporting the ring;
         two lateral supporting wall sections; and,
         two connecting sections for connecting the two lateral supporting wall sections to the raceway section;
      the ring is reshaped from a ring blank by a press tool; and,
      after reshaping, the ring is stamped in order to form a stop face for a cage or a sealing washer.

14. The method for producing the ring as claimed in claim 13, wherein the ring blank is bent out of a straight tube forming a bent tube, wherein ends of the bent tube are thermally connected to form the ring blank.

* * * * *